United States Patent [19]
Webster

[11] Patent Number: 5,136,463
[45] Date of Patent: Aug. 4, 1992

[54] UNIVERSAL ENCLOSURE WITH ELECTRICAL PANEL

[75] Inventor: James W. Webster, Bensenville, Ill.

[73] Assignee: Reliance Comm/Tec Corporation, Chicago, Ill.

[21] Appl. No.: 680,767

[22] Filed: Apr. 5, 1991

[51] Int. Cl.⁵ .............................................. H02H 1/04
[52] U.S. Cl. ..................................... 361/334; 174/38; 174/52.3; 312/223.1; 361/357
[58] Field of Search ............... 200/50 C; 307/150; 211/41; 312/223; 174/38, 52.1, 52.3, 59; 361/331, 334, 332, 333, 335, 356, 357, 358, 360, 390, 391

[56] References Cited

U.S. PATENT DOCUMENTS

| | | | |
|---|---|---|---|
| 3,634,732 | 1/1972 | Finger | 361/340 |
| 4,134,148 | 1/1979 | Schubert | 361/334 |
| 4,307,436 | 12/1981 | Eckart | 361/363 |
| 4,785,376 | 11/1988 | Dively | 361/334 |
| 4,839,477 | 6/1989 | Orosz | 200/50 AA |
| 4,951,182 | 8/1990 | Simonson | 362/145 |
| 5,001,600 | 3/1991 | Benson | 361/340 |
| 5,001,602 | 3/1991 | Suffi | 361/390 |

OTHER PUBLICATIONS

Reliance COMM/TEC catalog, Section 3, pp. 17-20 "Universal Enclosure" 1991.

*Primary Examiner*—Gerald P. Tolin
*Attorney, Agent, or Firm*—Trexler, Bushnell, Giangiorgi & Blackstone, Ltd.

[57] ABSTRACT

Apparatus for housing outside plant equipment in order to protect the equipment from the possibly harmful effects of weather and an external environment comprises a universal enclosure encompassing the outside plant equipment and having an interior and an exterior. An opening is disposed on the universal enclosure of a size sufficient to afford access to a predetermined portion of the equipment. The predetermined portion of the equipment is mounted adjacent the opening and in the interior of the universal enclosure, and is mounted in a disposition about the opening so as to be accessible only from the exterior of the universal enclosure. In this manner, one desiring to access the equipment may do so only from the exterior of the universal enclosure and will not be required or permitted to enter the interior thereof.

5 Claims, 3 Drawing Sheets

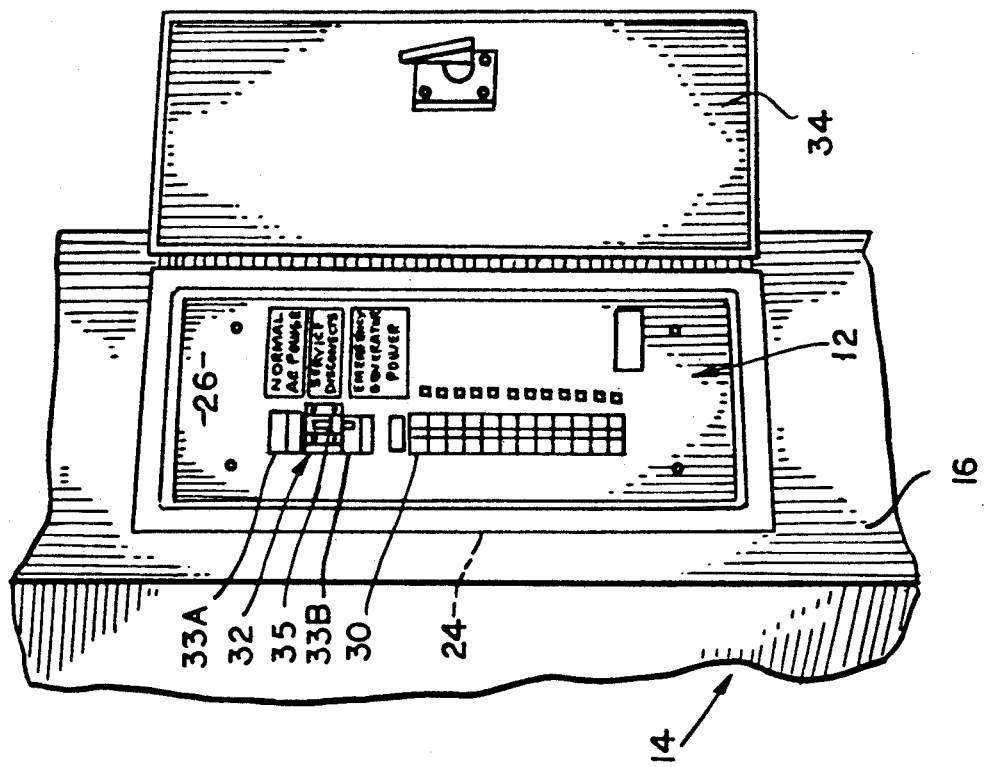
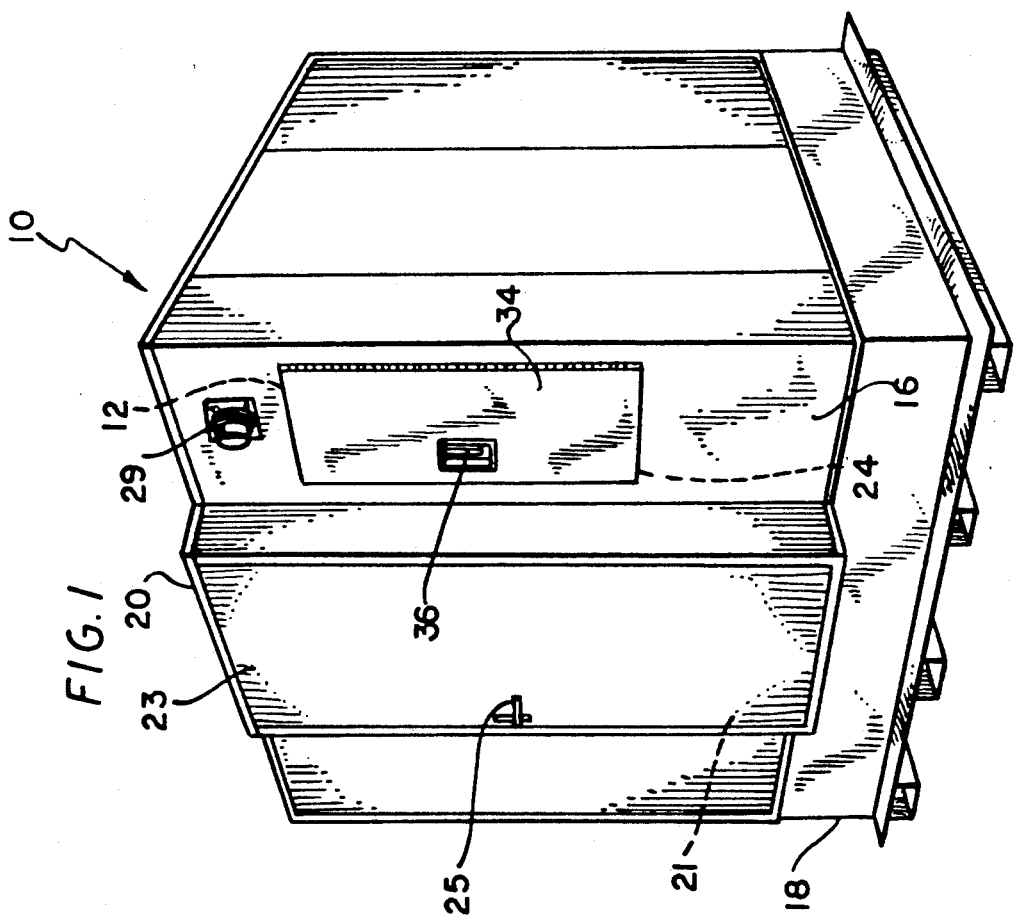

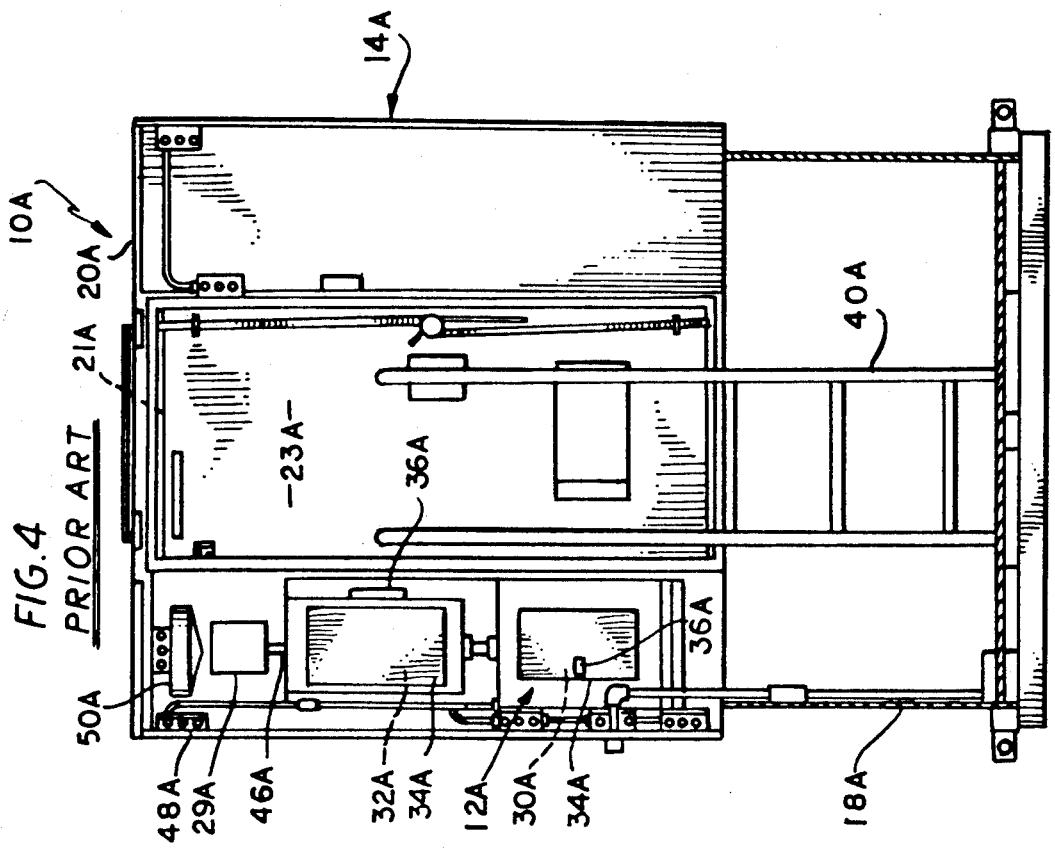
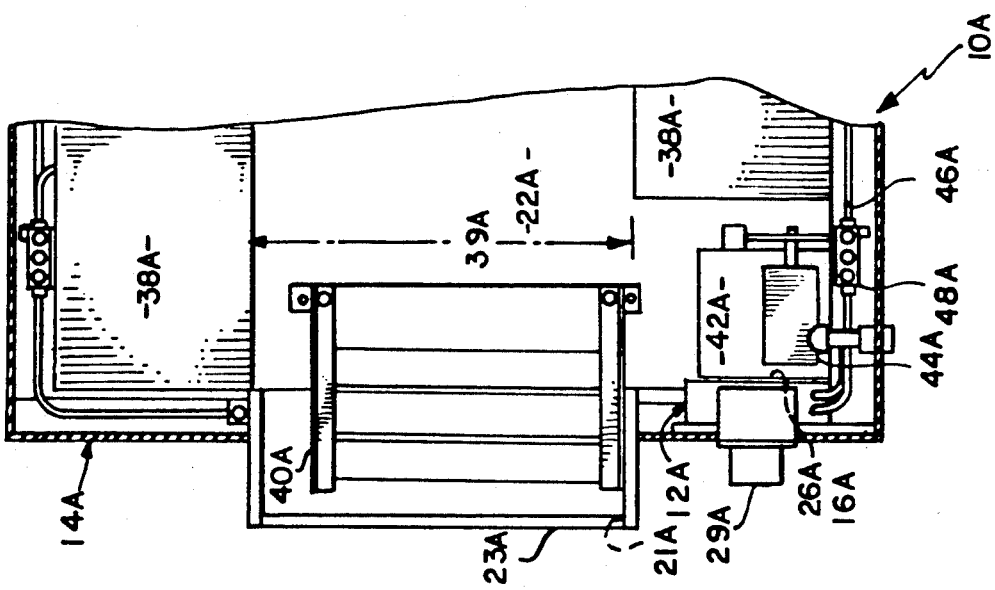

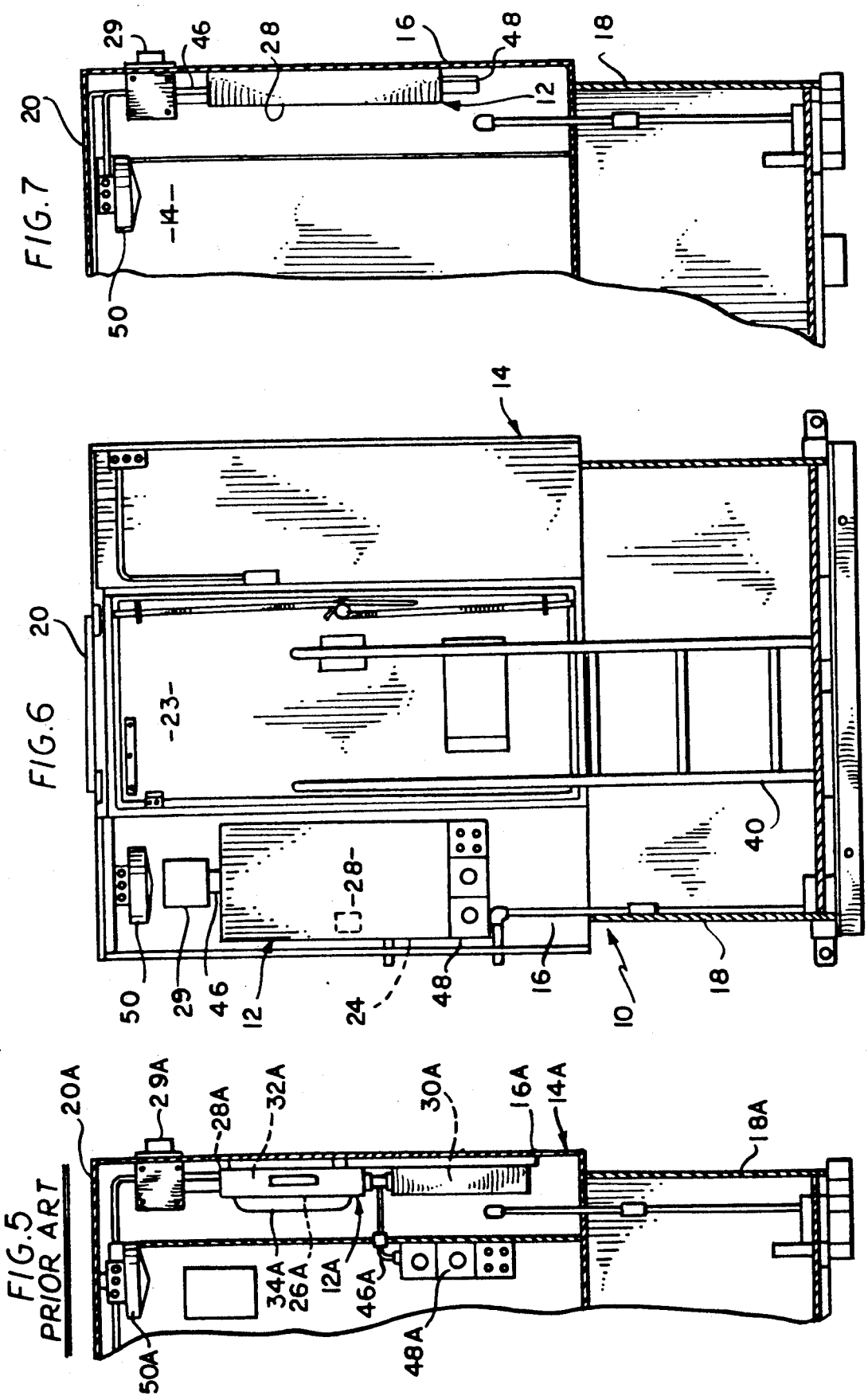

1

UNIVERSAL ENCLOSURE WITH ELECTRICAL PANEL

BACKGROUND OF THE INVENTION

The present invention relates generally to a novel and improved universal enclosure for use with housing outside plant electrical, telephonic, and other types of telecommunications and other related equipment. More specifically, the invention concerns a unique construction of a universal enclosure having an electrical panel mounted internally of the universal enclosure, but accessible from the exterior of the universal enclosure, thereby facilitating servicing of the equipment while maintaining craft separation.

With the construction of the present invention, an electrician needing to access the electrical panel can do so without entering the interior of the universal enclosure, thereby reducing the chances of accidental damage to or interference with the telecommunications equipment disposed in the interior of the universal enclosure. Also, there is greater work space available to the electrician when accessing the electrical wall wall panel from the exterior of the universal enclosure. Universal enclosures and cross-connect cabinets are well known in the art, and are employed extensively. The universal enclosure encompasses "outside plant," that is outside of a telephone company plant or central office ("C.O."), electronic and other telecommunications equipment necessary for the proper deliverance of the service provided by the telephone company to the subscriber. To do this, the universal enclosure accepts transmission cables, which allow for the transmission of signals from a C.O. to the universal enclosure. Once the signals, such as telephonic communication, and the like, produced by the C.O. reach the universal enclosure, the equipment encompassed therein acts upon the signals, performing a variety of functions. Such equipment may comprise switching equipment, multiplexing equipment, protection blocks for up to 1800 or 2100 derived pair, and other outside plant electronics compatible with digital loop carrier systems, including copper, radio, and fiber fed systems.

The universal enclosures protect the cables and equipment from the effects of the outside environment. To do this effectively, interior environment of the universal enclosures must be strictly monitored and controlled. Typically, the universal enclosures have a sealed ventilation system including air conditioners therein, so as to seal off the internal environment of the universal enclosure from its external environment to assure the effective and proper operation of the cables and the equipment therein. Because the universal enclosure is mounted in the ground, a sump pump is usually included inside the universal enclosure. Also, smoke, as well as toxic and explosive gas alarms monitor the interior environment of the universal enclosures.

The "outside plant" equipment, when taken together with all of the other above-mentioned necessities, is often quite sizeable. Therefore, the universal enclosure must be large enough to house all of the necessary equipment and cables, and to allow a workman access to that equipment and cables for maintenance, replacement or monitoring, and repair. Due to the complexity of the equipment, it is often better to give a workman as much space as possible in which he can complete his tasks. However, the universal enclosures are outside plant devices, and as such, the space available for the universal enclosure, and conjunctively the maximum size of the enclosure itself may be limited.

Universal enclosures of the prior art were able to house all of the necessary "outside plant" equipment. However, the access and work space available to workmen inside the universal enclosures was, in some cases, limited. This is, while some of the equipment was easily accessible, some were not. Specifically, space for access to the electrical service wall panel was sometimes limited. Also, because all of the equipment was housed inside the universal enclosure, an electrician, skilled only in the servicing of some of the pieces of equipment, could easily harm other pieces of equipment accidentally. This could result in significant down time for the equipment in the universal enclosure, and lost revenues to he generating station. Such occurrences can be minimized by limiting access to equipment to various workmen or "craftsmen" in accordance with their skills and responsibilities. This practice is generally referred to as "craft separation."

Accordingly, some alternative construction of a universal enclosure is desired that will provide sufficient work space to each workman, while still maintaining craft separation. The alternative construction could also reduce lost revenues caused by accidental harm to the "outside plant" equipment due to workmen trying their best to perform their tasks effectively in a cramped setting, and without adequate craft separation. The construction of the present invention, as already mentioned, provides the benefits of craft separation, that is disposing different pieces of equipment so that each piece, or family of pieces, is accessed differently (e.g. all telephonic equipment accessible from the interior of the universal enclosure, whereas all electrical equipment accessible only from the exterior, thereby eliminating the need of an electrician to have access to the interior of the universal enclosure). Additionally, the construction of the present invention groups like equipment adjacently, thereby resulting in greater convenience to workmen.

OBJECTS AND SUMMARY OF THE INVENTION

A general object of the invention is to provide a universal enclosure having some "outside plant" equipment accessible from the interior of the universal enclosure, and some "outside plant" equipment accessible from the exterior.

A more specific object of the present invention is to provide a universal enclosure having an internally mounted and externally accessible electrical panel.

Another object of the invention is to provide a universal enclosure having a work space available to a workman which is greater than the work spaces provided by other, currently available universal enclosures.

A further object of the present invention is to provide a universal enclosure having an electrical panel mounted flush with the exterior surface of the universal enclosure.

An additional object of the invention is to provide a universal enclosure wherein related equipment is disposed adjacently.

Briefly, and in accordance with the foregoing objects, apparatus for housing outside plant equipment in order to protect the equipment from the possibly harmful effects of weather and an external environment comprises a universal enclosure encompassing the outside plant equipment and having an interior volume and an exterior surface. At least one opening of a size sufficient to afford access to a pre-determined portion of the outside plant equipment is disposed upon the universal enclosure communicating from the interior volume to the exterior surface thereof. A pre-determined portion of the outside plant equipment is mounted adjacent the opening and within the interior volume of the universal enclosure in a disposition so as to be accessible only through the opening and from the exterior of the universal enclosure. In this manner, one desiring to access this portion of the equipment may do so from the exterior of the universal enclosure and not be required to enter the interior thereof.

BRIEF DESCRIPTION OF THE DRAWINGS

The features of the present invention which are believed to be novel are set forth with particularity in the appended claims. The organization and manner of operation of the invention, together with further objects and advantages thereof, may best be understood by reference to the following description taken in connection with the accompanying drawings in the several figures of which like reference numerals identify like elements, and in which:

FIG. 1 is a perspective view of a universal enclosure, constructed according to the present invention, having an internally mounted and externally accessed electrical panel;

FIG. 2 is an enlarged partial elevational view of the electrical panel of FIG. 1 with an access door being open, revealing the particular construction of the wall panel;

FIG. 3 is a partial top plan view of the interior of a universal enclosure of the prior art, showing the limited space available to a workman;

FIG. 4 is an elevational view of one side of the interior of a universal enclosure of the prior art, showing the internal access to the electrical panel and related equipment;

FIG. 5 is a partial elevational view of a side of the interior of a universal enclosure of the prior art at a right angle to the view of FIG. 4, further showing the internal access to the electrical panel and related equipment;

FIG. 6 is an elevational view, similar to the view of FIG. 4, of the interior of a universal enclosure, constructed according to the present invention, showing the internal mounting of the electrical panel; and FIG. 7 is an elevational view, similar to that of FIG. 5, of the interior of a universal enclosure, as shown in FIG. 6, showing the internal mounting of and external access to the electrical panel.

DETAILED DESCRIPTION OF THE ILLUSTRATED EMBODIMENT

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein. The invention will be discussed with relation to an electrical panel, however, it is to be noted that other families of equipment associated with a universal enclosure can also be internally mounted and externally accessed.

Referring initially to FIG. 1, a universal enclosure 10, constructed according to the teachings of the present invention, having an internally mounted and externally accessible electrical panel 12 is shown. The universal enclosure 10 is of a construction similar to that of the universal enclosure of the type designated "UE" available from Reliable Electric/Utility Products Division of Reliance Comm/Tec Corporation, 11333 Addison Street, Franklin Park, Ill. 60131. Reliance Comm/Tec is the assignee of the present invention.

The universal enclosure 10 is constructed so as to house outside plant equipment, such as regulators, monitoring devices, switches, circuit breakers, and the like. The construction of the universal enclosure 10 must be strong and sturdy. This is necessary because the universal enclosure 10 is mounted in the ground, and must effectively protect the equipment encompassed therein from the possibly harmful effects of exposure to the outside environment (i.e. precipitation, high winds, humidity, dust, and both air and water-borne pollutants).

Basically, the universal enclosure 10 has a wall 14, comprising a plurality of wall panels 16, a base 18, and a top 20. The wall 14 and the top 20 are usually constructed of a very strong, weather-proof material, such as heavy gauge mill-galvanized steel and the like. The base 18 is also subject to similar design specifications, and can be constructed of a material such as hot dipped galvanized steel plate or concrete, for example. This type of construction is necessary because the base 18 is buried in the ground. The wall panels 16 of the wall 14 are substantially smooth and planar, and extend from the base 18 to the top 20. The wall panels 16, and therefore the wall 14, are substantially perpendicular to both the base 18 and the top 20. Thus, the wall 14, along with the base 18 and the top 20, define an interior 22 of the universal enclosure 10. This interior 22, and correspondingly the wall 14, must be large enough to house at least the equipment, and any cables connected thereto. Also, the interior 22 must be of sufficient dimensions so that a workman can enter and access the equipment for maintenance, service, and replacement thereof, and have sufficient working space for these purposes.

The top 20 of the universal enclosure 10 is substantially planar, and substantially perpendicular to the wall panels 16 of the wall 14. The top 20 and the wall panels 16 are joined in a unique fashion so as to ensure a weather-proof, water-tight fit. The base 18 and the wall panels 16 are joined in a similar fashion. In this manner, the interior 22 of the universal enclosure 10 is effectively sealed off from the surrounding environment. This is extremely important because the universal enclosure 10 is designed to be mounted on the ground in the open, where the universal enclosure 10 will be subject constantly to the effects of the ambient environment.

As stated above, the wall panels 16 of the universal enclosure 10 are substantially planar. However, some wall panels 16 do possess variations to the overall planar construction. At least one of the wall panels 16 has an opening 21 therein. The opening 21 is large enough to allow a workman access to the interior 22 of the universal enclosure 10, so that the workman can service the equipment housed therein. A door 23, having a controlled access locking system including a handle 25 which facilitates manipulation of the door 23, covers the opening 21. When the door 23 is in a closed position, the door 23 is flush with the wall 14 of the universal enclosure 10, and forms a water-tight seal therewith so as to protect the equipment from the possibly adverse effects of the ambient environment.

At least one other of the wall wall panels 16 has an opening 24 therein. The opening 24 is large enough so as to afford access to an the electrical panel 12 as shown in FIG. 2. The electrical panel 12 has a face surface 26 and a back surface 28, which completely encloses the electrical equipment housed within the electrical panel 12 behind the face surface 26. As shown in FIG. 6 and FIG. 7, the electrical panel 12 is mounted on a side of the wall panels 16 confronting the interior 22 of the universal enclosure 10 so that the back surface 28 of the electrical panel 12 protrudes from the wall panels 16 into the interior 22 of the universal enclosure 10. The face surface 26 of the electrical panel 12 extends completely across the opening 24 in the wall panel 16, and is mounted in such a manner as to provide a weather-proof, water-tight seal between the wall panel 16 and the electrical panel 12. This is done so that the effects of the surrounding environment will not damage the electrical equipment behind the face surface 26 of the electrical panel 12, or any of the equipment inside the universal enclosure 10.

In another variation to the generally planar construction of the wall panels 16 is the disposition of an auxiliary receptacle 29 through at least one of the wall panels 16. The auxiliary receptacle 29 is weather-proof, so that it will not be damaged by exposure to the environment. The auxiliary receptacle 29 allows connection to an auxiliary electrical power source, such as a generator, to supply the electrical panel 12 in the absence of or in the event of a temporary of electric utility-supplied power.

The electrical panel 12 is mounted on one of the wall panels 16 so that the operative elements of the electrical panel 12 are accessible only from the exterior of the universal enclosure 10. As shown in detail in FIG. 2, the electrical panel 12 encompasses all of the necessary operative electrical power distribution elements, such as a bank of circuit breakers 30 having a varying range of amperage. Moreover, and departing from the prior art practice, a disconnect or safety switch 32, capable of changing the electrical service, such as from normal electric utility-supplied AC power to emergency or auxiliary generator power, shown clearly by the labels depicted in FIG. 2, is also incorporated into the single electrical panel 12, on the face surface 26 thereof. In the prior art construction shown in FIG. 3 through 5, the safety switch 32A is provided as a separate element, independently of electrical panel 12A, which houses the circuit breakers.

The safety switch 32 is connected to a pair of switch means, or double pole circuit breakers 33A and 33B, as shown clearly in FIG. 2. The switch means allows an operator thereof to select either electrical utility-supplied power (via 33A) or an auxiliary source (via 33B) of electrical power. By actuating the switch means, an operator thereof can change the source of the electrical power being supplied to the bank of circuit breakers 30. Additionally, switch lockout means, or a mechanical switch 35, is included therewith. The switch lockout means permits the actuation of only one of the pair of switch means at any one given time. The switch lockout means provides a means for insuring that only one source of electrical power can be selected and supplied to the bank of circuit breakers 30 at a time. Therefore, the switch lockout means allows for selection of either the electric utility-supplied power or the auxiliary source of power at any one given time. This prevents concurrent selection of different power sources.

More specifically, the safety switch 32 comprises at least two double pole circuit breakers 33A and 33B, and a mechanical switch 35. Each of the double pole circuit breakers 33A and 33B can be constructed to meet any desired amperage, and the mechanical switch 35 is capable of permitting selection the appropriate, desired power source, as disclosed above. The mechanical switch 35 can be pivoted into two positions. In a first position, the mechanical switch 35 presents a physical barrier to actuation of the double pole circuit breaker 3A, thereby preventing actuation of the electric utility-supplied power. In a second position, shown in FIG. 2, the mechanical switch 35 presents a physical barrier to actuation of the double pole circuit breaker 3B, thereby preventing actuation of the auxiliary source of power. Thus, to actuate the double pole circuit breaker 33A, the mechanical switch 35 must be in the second position, thereby preventing concurrent selection of different power sources.

This particular safety switch 32 construction has been tested and approved by Underwriter's Laboratories. The presence of the double pole circuit breakers 33A and 33B in the safety switch 32, constructed according to the teachings of the present invention, adds greater versatility to a workman needing access to a source of electrical power, and provides additional protection during over-current power surges. The safety switch 32 offers distinct advantages over the safety switches found in the prior art in that the prior art constructions did not have built-in over-current power surge protection. This made the prior art constructions comparatively large and bulky, thereby further adding to the already cramped working conditions.

Additionally, the electrical panel 12 is covered by an access door 34 having a controlled access latching-/locking system including a handle 36 which facilitates in manipulation of the access door 34. The access door 34, when in a closed position, is flush with the wall 14, and forms a weather-proof, water-tight seal therebetween. The access door 34 can be removed completely from the universal enclosure 10 in order to facilitate in completion of a workman's tasks. In this manner, a workman needing to access the electrical panel 12 can do so from the exterior of the universal enclosure 10, and will not be required or permitted to enter the interior 22 of the universal enclosure 10.

This construction is highly advantageous when compared with the constructions of the prior art, as will now be detailed. Referring to FIG. 3 through 5, elements of the prior art, corresponding to like elements in the present invention, are designated by like reference numerals with the suffix "A." In the prior art, the electrical panel 12A, having an access door 34A, is internally mounted and internally accessed inside the universal enclosure 10A, as shown in FIG. 3 through FIG. 5. As mentioned above, in the prior art, the bank of circuit breakers 30A and the disconnect switch 32A were separated, as also shown in FIG. 4 and 5. This arrangement presents only limited work space for working upon the electrical panel 12A, considering all of the other equipment also mounted internally.

Specifically, the interior 22A of the universal enclosure 10A houses a plurality of banks 38A of equipment necessary for signal processing and transmission. The banks 38A occupy most of the space available in the interior 22A of the universal enclosure 10A, leaving only a central aisle 39A open as a working space. The aisle 39A is entered by a ladder 40A. Remaining space is occupied by a sump 42A, a sump pump 44A, and various electrical conduits 46A and receptacles 48A, as shown in FIG. 3. Further, at least one smoke alarm 50A was mounted on the interior 22A of the universal enclosure 10A. The layout of the universal enclosure 10 of the present invention is similar in its layout as to the foregoing items. More importantly, due to the limited working space in the interior 22A, access to the electrical service components was particularly difficult. Moreover, such access necessitated entry of the electrician into the universal enclosure, thus lessening the degree of craft separation.

The universal enclosure 10 of the present invention alleviates all of these problems. As shown in FIG. 6, the bank of circuit breakers 30 and the disconnect switch 32 are combined in the electrical panel 12, thereby more efficiently using the space available. Also, receptacles 48 are disposed immediately adjacent to the electrical panel 12, thereby reducing the amount of electrical conduits 46 in the interior 22, as shown in FIG. 6 and FIG. 7. More importantly, the exclusive external accessibility of the electrical panel 12, provides essentially unlimited work space to the electrician, and maintains a higher degree of craft separation.

The construction of the universal enclosure 10 presents numerous benefits to a workman not available with the prior art. Specifically, like equipment is grouped together, thereby allowing for craft separation and convenience of service. Electricians can access all necessary equipment from the exterior of the universal enclosure 10, whereas telephonic workmen, for example, can access all necessary equipment from the interior 22. This can serve to minimize the probability of accidental damage to one piece of equipment, while a workman is repairing another piece.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering and design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. Apparatus housing outside plant telecommunications equipment accessible for service and activation only from within the apparatus, without dismantling said apparatus, comprising: a universal enclosure having an interior and an exterior; the universal enclosure for protecting telecommunications equipment housed in the interior from possibly harmful effects of surrounding environments; said equipment including switching equipment, multiplexing equipment or protection blocks and being housed in the interior such that said equipment is accessible only form the interior without dismantling the apparatus; an interior access door disposed on the apparatus for allowing a workman to enter the interior; the interior being of dimensions sufficient for allowing a workman to physically bodily enter, such that no body portion of the workman remains outside the interior, and access the telecommunications equipment for service and activation; an opening disposed in the universal enclosure communicating to the exterior thereof; an electrical service panel including a bank of circuit breakers and mounted in the interior of the universal enclosure adjacent the opening; mounting means mounting the electrical service panel within the interior so that the panel is accessible for service and activation only form the exterior, without dismantling said apparatus, so that a workman will not be required or permitted to enter the interior of the universal enclosure in any way to service and to activate the electrical service panel; and a controlled access door disposed over the opening such that the controlled access door must be opened from the exterior to operatively access the electrical service panel for service and activation.

2. Apparatus housing outside plant telecommunications equipment as defined in claim 1 further comprising a power receptacle for supplying electrical power to the electrical service panel mounted on the exterior of the universal enclosure and electrically connected to the electrical service panel in the interior of the universal enclosure so that a workman cannot enter the interior of the universal enclosure in any way to connect a source of electrical power to the power receptacle without dismantling the apparatus.

3. Apparatus housing outside plant equipment as defined in claim 1 wherein outside plant equipment is disposed along interior wall surfaces of the interior of the universal enclosure.

4. Apparatus housing outside plant telecommunications equipment as defined in claim 1 wherein the electrical service panel includes at least one circuit breaker and a pair of switch means for selecting one of electrical utility-supplied power and another source of electrical power for supplying power to the circuit breaker; and switch lockout means for permitting the operation of only one of the switch means at a time to permit selection of only one of the electric utility-supplied power and another source of electrical power at a time.

5. Apparatus housing outside plant telecommunications equipment as defined in claim 1 wherein the access door is disposed over the opening so that contact between the access door and the universal enclosure forms a water-tight, weather-proof seal therebetween so that the predetermined portion of the equipment will not be exposed to an exterior atmosphere.

* * * * *